April 27, 1965    E. FUHRMANN ETAL    3,180,564
RADIAL SEAL FOR ROTARY PISTON ENGINES
Filed July 1, 1963

Inventors
Ernst FUHRMANN &
Manfred FRENZEL
By Toulmin & Toulmin
Attys

United States Patent Office 3,180,564
Patented Apr. 27, 1965

3,180,564
RADIAL SEAL FOR ROTARY PISTON ENGINES
Ernst Fuhrmann, Burscheid, near Cologne, and Manfred Frenzel, Burscheid, Bezirk Dusseldorf, Germany, assignors to Goetzewerke Friedrich Goetze Aktiengesellschaft, Burscheid, near Cologne, Germany, a corporation of Germany
Filed July 1, 1963, Ser. No. 293,229
Claims priority, application Germany, July 2, 1962, G 35,356
8 Claims. (Cl. 230—145)

The invention disclosed herein is concerned with a radial seal for rotary piston engines, which is radially movably seated in a groove of a polygonal piston.

It is known to employ for the sealing of pistons in rotating piston engines, especially internal combustion motors, so-called sealing bars which are radially movably arranged within grooves formed at the corners of the piston. The use of springs acting radially outwardly on the respective sealing bars makes it possible to hold such bars in continuous engagement with the inner wall of the enveloping body even at relatively low speed of rotation of the piston.

It was found that the weight of the sealing bars affects the sealing action thereof. According to experience, the formation of chatter marks on the inner wall of the enveloping body is to be expected, especially at higher speeds of rotation of the piston, such chatter marks pointing to the conclusion that the sealing bars did not effect a satisfactory sealing action. It has been proposed to avoid such chatter marks by the provision of auxiliary elements for damping vibrations of the sealing bars without, however, obtaining satisfactory results.

The invention is based upon recognition of the fact that the weight of the sealing bar is of particular importance for the sealing action effected thereby. It has been found that the use of sealing bars which are made as light as possible greatly reduces the tendency to produce chatter marks.

According to the invention, it is proposed to make the radially acting sealing bars in the form of hollow members, thus permitting in most simple manner production of extremely light-weight bar-like sealing elements.

The various objects and features of the invention will appear from the description of embodiments which is rendered below with reference to the accompanying drawing. In the drawing, FIG. 1 shows in cross-sectional representation a bar-like sealing member with cross-sectionally U-shaped configuration;

FIG. 2 indicates a cross-sectionally tubular bar-like sealing member;

Figure 1:
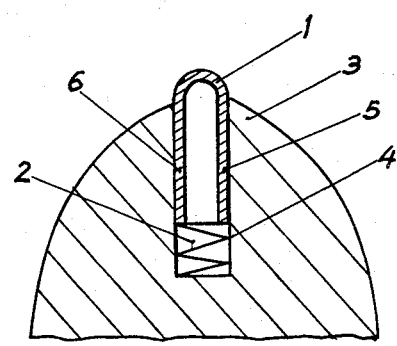

The bar-like sealing member 1 shown in FIG. 1 is cross-sectionally generally U-shaped, its legs 5 and 6 being in resilient engagement with walls of the groove 2 formed in the piston 3, a spring 4 being provided for pressing the bar-like member radially outwardly with its outer end into engagement with the inner wall of the enveloping body (not shown). If desired, the legs 5 and 6 may be disposed in separate grooves formed in the piston. However, it will generally suffice to dispose the legs of the bar in a common piston groove.

Figure 2:
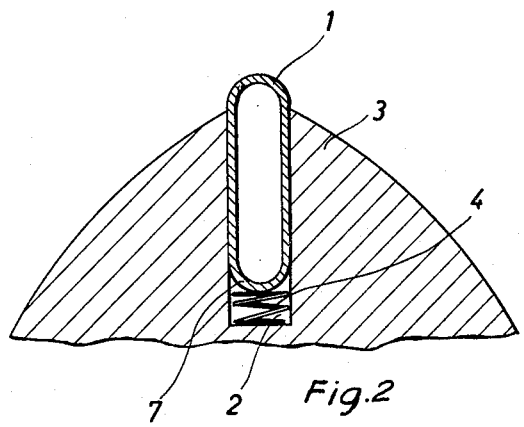

As shown in FIG. 2, the bar-like sealing member may be tubular, formed from a tube which is flattened to the desired dimension for disposal in the piston groove 2. The bar-like member is thus closed at its outer end and likewise at its inner end. Numeral 4 again indicates a spring which biases the bar-like member radially outwardly.

The opposite ends of the bar-like member can in any embodiment be closed by suitable and appropriate pipe closure elements so as to prevent ingress thereinto of the medium against which the seal is provided.

Figure 3:
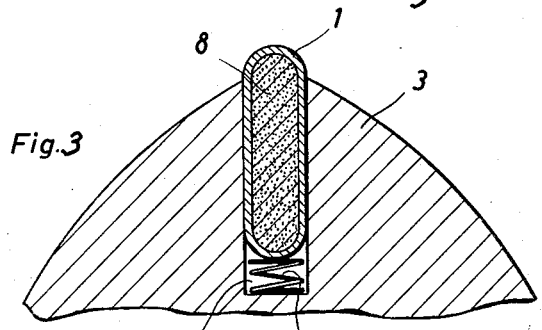
FIG. 3 represents a cross-sectionally tubular bar-like sealing member containing a heat resistant material.

Such ingress may also be prevented by filling the bar-like member with a known and suitable light-weight heat resistant mass, as shown in FIG. 3, the filler material being indicated by numeral 8.

The filler material may be disposed within the tube from which the bar is formed by a flattening operation, prior to the flattening thereof, thus also functioning as a means which prevents buckling of the tube during the flattening. It is, however, also possible to dispose the filler material within the tubular bar-like member after the flattening operation.

Figure 4:
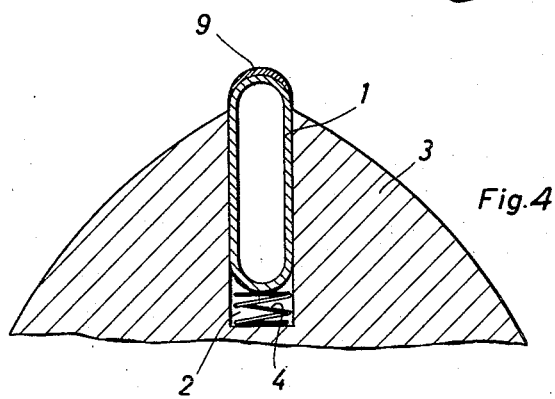
FIG. 4 illustrates a cross-sectionally tubular bar-like sealing member provided at its cylinder engaging end with a wear resistant coating.

The outer cylinder-engaging end of the bar-like member may be provided, in any embodiment thereof, with a known and suitable wear-resistant coating, for example, a chromium coating as indicated by numeral 9 in FIG. 4.

Figure 5:
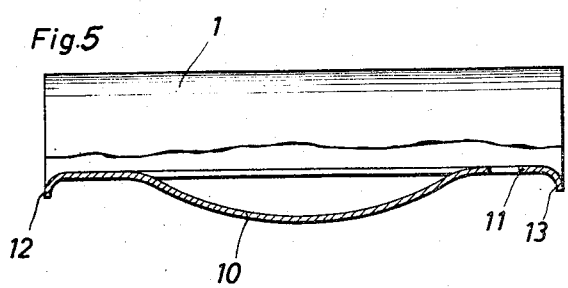
FIG. 5 shows a bar-like sealing member partially in elevational side view with a spring punched out from the material thereof.
Figure 6:
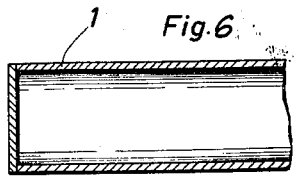
FIG. 6 shows a transverse section through an end wall at one end thereof.

As shown in FIGS. 1 to 4, spring means 4 may be provided in any of the illustrated embodiments so as to exert radial outward pressure on the respective bar-like members to hold the outer end thereof in continuous engagement with the inner wall of the enveloping cylinder body. As shown in FIG. 5, one or more springs 10 may be made integral with the body of the bar-like sealing member, by punching it from the inner end thereof, leaving angularly bent extensions 12 and 13 at the opposite lateral ends of the bar-like member which delimit the radial displacement of the respective spring or springs.

The bar-like sealing member may in any embodiment thereof be pretensioned for insertion into the piston groove formed therefor. The sidewalls of such member may for this purpose be resiliently formed so as to engage the flanks of the piston groove with slight pressure, thus providing for a vibration damping action.

Changes may be made within the scope and spirit of the appended claims which define what is believed to be new and desired to have protected by Letters Patent.

What is claimed is:

1. A bar-like sealing member operating as a radial seal disposed in a groove formed in a piston of a rotary piston engine, consisting of a hollow tubular body comprising side walls extending substantially in parallel relationship and a transverse end wall at least at one end thereof for sealing engagement with the inner wall of the piston enveloping body, rounded top and bottom wall means interconnecting said side wall means at the radially inner and outer edges of the body, and said body having a dimension measured between said top and bottom wall means which is several times the dimension measured between said side walls.

2. A bar-like sealing member according to claim 1, consisting of a transverse wall at each end thereof.

3. A bar-like sealing member according to claim 1, comprising a mass of heat resistant material contained in said hollow body.

4. A bar-like sealing member according to claim 1, wherein said side walls are pretensioned outwardly to provide resilient engagement of at least part of the side walls thereof with the flanks of said groove.

5. A bar-like sealing member according to claim 1, comprising a radially directed extension formed from the material of said hollow body at each lateral end thereof and facing in a direction away from the member and toward the bottom of said groove.

6. A bar-like sealing member according to claim 1, comprising radially acting spring means formed from the material of the bottom wall means of said hollow body at the radially inner edge thereof which faces the bottom of said groove to engage the bottom of the groove and exert resilient outward pressure on said body so as to secure sealing engagement of the radially outer edge thereof with the inner wall of the piston-enveloping body.

7. A bar-like sealing member according to claim 1, comprising radially acting spring means formed from the material of the bottom wall means of said hollow body at the radially inner edge thereof which faces the bottom of said groove to engage the bottom of the groove and exert resilient outward pressure on said body so as to secure sealing engagement of the radially outer edge thereof with the inner wall of the piston-enveloping body, and a radially directed extension likewise formed from the material of said hollow body at each lateral end thereof and facing in the direction of bottom of said groove, said extensions delimiting the displacement of said spring means.

8. A bar-like sealing member according to claim 1, consisting of a flattened tubular body having a transverse wall at each radially directed end thereof, radially acting spring means formed from the material of said body at the radially directed inner edge thereof which faces the base of said groove to engage the bottom of the groove and exert resilient radial outward pressure on said body so as to secure sealing engagement of the radially outer edge thereof with the inner wall of the piston-enveloping body, and a radially directed extension likewise formed from the material of said hollow body at each lateral end thereof and facing in the direction of the bottom of said groove, said extensions delimiting the displacement of said spring means.

References Cited by the Examiner

UNITED STATES PATENTS

| Re. 24,932 | 1/61 | Davey | 230—152 |
| 1,385,880 | 7/21 | Master | 123—8 |
| 1,550,286 | 8/25 | Sorge | 103—136 |
| 2,189,976 | 2/40 | De Lavaud | 123—8 |
| 2,465,887 | 3/49 | Larsh | 230—152 |
| 2,688,924 | 9/54 | Links | 103—136 |
| 3,009,421 | 11/61 | Livermore et al. | 103—135 |
| 3,038,412 | 6/62 | Clark | 103—136 |

JOSEPH H. BRANSON, JR., *Primary Examiner.*
WILBUR J. GOODLIN, *Examiner.*